(12) United States Patent
Junk

(10) Patent No.: US 12,278,892 B2
(45) Date of Patent: Apr. 15, 2025

(54) METHOD AND SYSTEM FOR SYMMETRIC KEY DISTRIBUTION BETWEEN ELECTRONIC VEHICLE COMPONENTS

(71) Applicant: GM GLOBAL TECHNOLOGY OPERATIONS LLC, Detroit, MI (US)

(72) Inventor: Kenneth William Junk, Marshalltown, IA (US)

(73) Assignee: GM Global Technology Operations LLC, Detroit, MI (US)

( * ) Notice: Subject to any disclaimer, the term of this patent is extended or adjusted under 35 U.S.C. 154(b) by 300 days.

(21) Appl. No.: 17/832,102

(22) Filed: Jun. 3, 2022

(65) Prior Publication Data
US 2023/0396417 A1 Dec. 7, 2023

(51) Int. Cl.
*H04L 9/08* (2006.01)
*H04L 9/00* (2022.01)
*H04L 9/32* (2006.01)

(52) U.S. Cl.
CPC ............ *H04L 9/0841* (2013.01); *H04L 9/006* (2013.01); *H04L 9/085* (2013.01); *H04L 9/3242* (2013.01);
(Continued)

(58) Field of Classification Search
CPC ....... H04L 9/0841; H04L 9/006; H04L 9/085; H04L 9/3242; H04L 9/3271;
(Continued)

(56) References Cited

U.S. PATENT DOCUMENTS

| | | | |
|---|---|---|---|
| 9,660,970 B1 * | 5/2017 | Rubin | H04L 9/0891 |
| 2003/0009687 A1 * | 1/2003 | Ferchau | G06F 21/64 |
| | | | 713/176 |

(Continued)

FOREIGN PATENT DOCUMENTS

WO WO-2019246206 A1 * 12/2019 ............. H04L 9/006

OTHER PUBLICATIONS

Aida Abdon Diop, "Cryptographic mechanisms for device authentication and attestation in the internet of things", Cryptography and Security [cs.CR], Institut Polytecnique de Paris, 2020, English. NNT: 2020IPPAS023, 190 pages.
(Continued)

*Primary Examiner* — Bryan F Wright
(74) *Attorney, Agent, or Firm* — Quinn IP Law

(57) ABSTRACT

A method and system for public key infrastructure (PKI) in software defined vehicles enables secure communication between electronic components. The method includes establishing trust between multiple electronic components through a certificate history comprising signed public keys stored on each component. Once trust is established through attestation between components, the method utilizes signed Diffie-Hellman key exchange to securely distribute symmetric keys to the trusted components. These symmetric keys enable authenticated communication between the components to control vehicle systems and functions. The system operates locally without requiring internet connectivity or specialized service tools, allowing for secure field replacement and upgrading of components while maintaining system security through verification of component authenticity and prevention of counterfeit hardware.

18 Claims, 9 Drawing Sheets

(52) U.S. Cl.
CPC ........ *H04L 9/3271* (2013.01); *H04L 2209/84* (2013.01)

(58) Field of Classification Search
CPC ..... H04L 2209/84; H04L 9/3247; H04L 9/40; H04L 9/3263
USPC ........................................................ 713/171
See application file for complete search history.

(56) References Cited

U.S. PATENT DOCUMENTS

| | | | |
|---|---|---|---|
| 2017/0324704 A1* | 11/2017 | Wood ..................... | H04L 63/08 |
| 2019/0281052 A1* | 9/2019 | Lekkas .................... | H04L 9/14 |
| 2020/0029209 A1* | 1/2020 | Nölscher ............. | H04W 12/069 |
| 2023/0093992 A1* | 3/2023 | Shah ................ | H04W 12/0431 |
| | | | 713/171 |

OTHER PUBLICATIONS

Elaine Palmer, "Attestation of System Components v1.0 Requirements and Recommendations", Open Compute Project, Nov. 4, 2020, 38 pages.
Wikipedia, "Diffie-Hellman key exchange", Apr. 8, 2022, 12 pages.
Intel, "PCI Express Device Security Enhancements", Version 0.71, Sep. 2018, 46 pages.

* cited by examiner

METHOD AND SYSTEM FOR SYMMETRIC KEY DISTRIBUTION BETWEEN ELECTRONIC VEHICLE COMPONENTS

INTRODUCTION

The disclosure generally relates to a method and system for public key infrastructure (PKI) for serviceable electronic components in software defined vehicles.

A vehicle utilizes computerized hardware and software to control operations of various systems within the vehicle. Computerized hardware may include a circuit board. Some physical components or devices are attached to the circuit board permanently or are soldered to the circuit board. Other devices are replaceable or may be upgraded by removing an old device and replacing it with a new device.

SUMMARY

A method for public key infrastructure for serviceable electronic components is provided. The method includes identifying a plurality of electronic components in electronic communication with each other and establishing that each of the plurality of electronic components is a trusted device according to a certificate history including a plurality of signed public keys stored upon the respective electronic component. The method further includes utilizing signed Diffie-Hellman key exchange to distribute symmetric keys to each of the plurality of electronic components and communicating between the plurality of electronic components with the symmetric keys to achieve tangible functions that may be provided by the plurality of electronic components.

In some embodiments, establishing that each of the plurality of electronic components is the trusted device according to the certificate history includes creating and storing upon the respective electronic component a signed public key of an end product manufacturer, a signed public key of a component manufacturer, and a signed public key of the electronic component.

In some embodiments, creating and storing upon the respective electronic component the signed public key of the end product manufacturer, the signed public key of the component manufacturer, and the signed public key of the electronic component includes the end product manufacturer self-signing the public key of the end product manufacturer, the end product manufacturer signing the public key of the component manufacturer, and the component manufacturer signing the public key of the device.

In some embodiments, the plurality of electronic components is installed to a vehicle. Communicating between the plurality of electronic components includes providing electronic commands to a system of the vehicle affecting operation of the vehicle.

In some embodiments, the system of the vehicle includes one of a navigation system, a braking system, a system controlling an electric motor, and an infotainment system.

In some embodiments, wherein establishing that each of the plurality of electronic components is the trusted device includes utilizing attestation between the plurality of electronic components.

In some embodiments, utilizing the attestation includes each of the electronic components challenging each other to provide responses signed by private keys and determining authenticity of the devices based upon validity of the responses.

In some embodiments, the plurality of electronic components is each connected to a central compute unit providing the electronic communication. A first component of the plurality of electronic components is established as trusted by being soldered to the central compute unit. Utilizing the attestation includes the first component of the plurality of electronic components challenging a second component of the plurality of electronic components and defining the second component as trusted based upon a reply from the second component.

In some embodiments, utilizing the Diffie-Hellman key exchange to distribute symmetric keys to each of the plurality of electronic components includes establishing a shared secret between the plurality of electronic components.

In some embodiments, establishing the shared secret includes iteratively signing public keys of the plurality of electronic components with private keys of the plurality of electronic components to create signed public keys and defining the shared secret based upon the signed public keys of the plurality of electronic components.

According to one alternative embodiment, a method for public key infrastructure for serviceable electronic components in a vehicle is provided. The method includes identifying a plurality of electronic components in electronic communication with each other and establishing that each of the plurality of electronic components is a trusted device according to a certificate history including a plurality of signed public keys stored upon the respective electronic component. The method further includes utilizing Diffie-Hellman key exchange to distribute symmetric message authentication codes to each of the plurality of electronic components and communicating between the plurality of electronic components with the symmetric message authentication codes to achieve tangible functions in a system of the vehicle affecting operation of the vehicle that may be provided by the plurality of electronic components.

In some embodiments, establishing that each of the plurality of electronic components is the trusted device according to the certificate history includes creating and storing upon the respective electronic component a signed public key of an end product manufacturer, a signed public key of a component manufacturer, and a signed public key of the electronic component.

In some embodiments, creating and storing upon the respective electronic component the signed public key of the end product manufacturer, the signed public key of the component manufacturer, and the signed public key of the electronic component includes the end product manufacturer self-signing the public key of the end product manufacturer, the end product manufacturer signing the public key of the component manufacturer, and the component manufacturer signing the public key of the device.

In some embodiments, establishing that each of the plurality of electronic components is the trusted device includes utilizing attestation between the plurality of electronic components.

In some embodiments, utilizing the attestation includes each of the electronic components challenging each other to provide responses signed by private keys and determining authenticity of the devices based upon validity of the responses.

In some embodiments, the plurality of electronic components are each connected to a central compute unit providing the electronic communication. A first component of the plurality of electronic components is established as trusted by being soldered to the central compute unit. Utilizing the attestation includes the first component of the plurality of electronic components challenging a second component of the plurality of electronic components and defining the second component as trusted based upon a reply from the second component.

In some embodiments, utilizing the Diffie-Hellman key exchange to distribute symmetric message authentication codes to each of the plurality of electronic components includes establishing a shared secret between the plurality of electronic components.

In some embodiments, establishing the shared secret includes iteratively signing public keys of the plurality of electronic components with private keys of the plurality of electronic components to create signed public keys and defining the shared secret based upon the signed public keys of the plurality of electronic components.

According to one alternative embodiment, a system for public key infrastructure for serviceable electronic components is provided. The system includes a plurality of electronic components in electronic communication with each other. Each of the plurality of electronic components have been identified as trusted devices according to a certificate history including a plurality of signed public keys. Each of the plurality of electronic components are configured for utilizing a Diffie-Hellman method to distribute symmetric message authentication codes.

The above features and advantages and other features and advantages of the present disclosure are readily apparent from the following detailed description of the best modes for carrying out the disclosure when taken in connection with the accompanying drawings.

DETAILED DESCRIPTION

Figure 1:
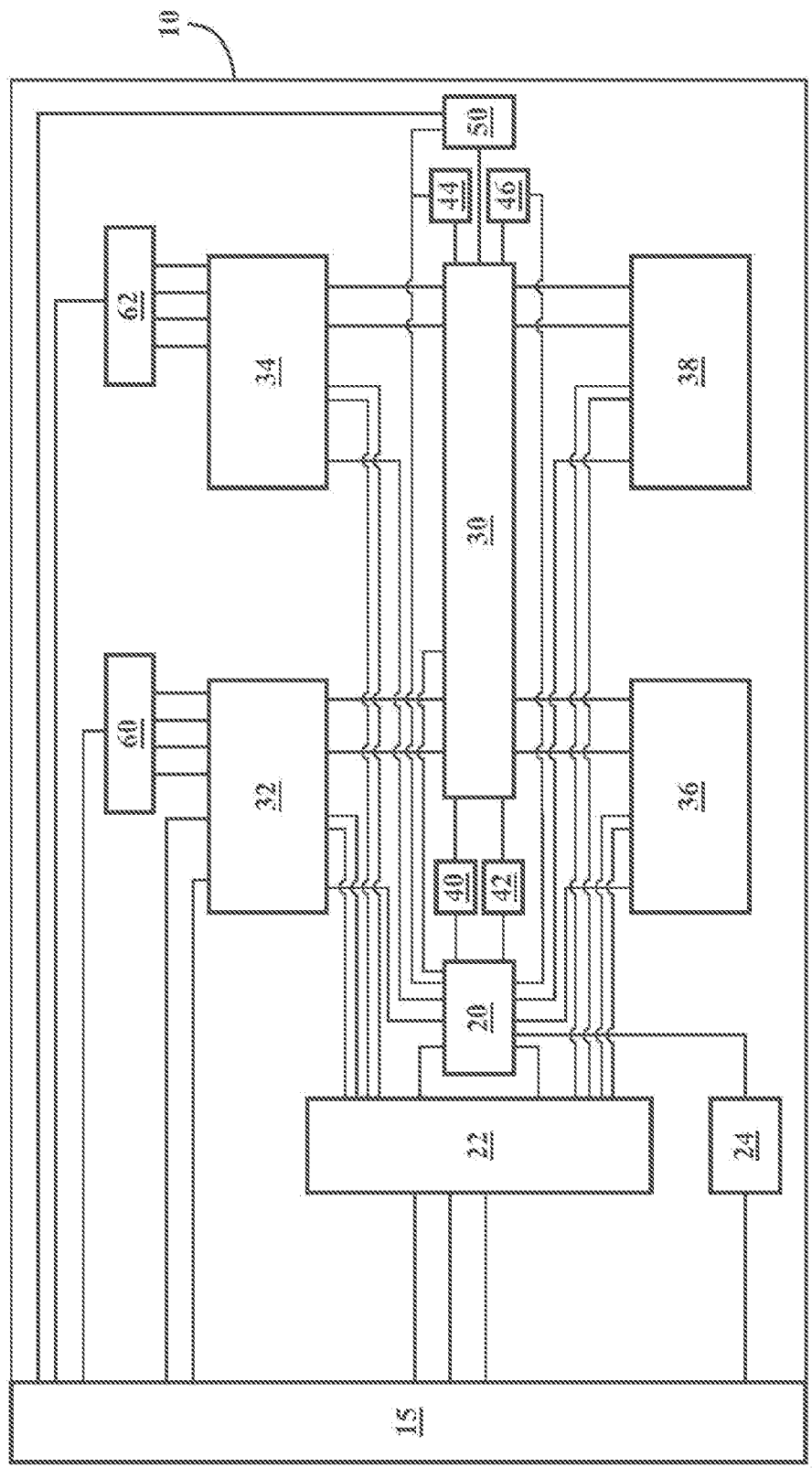
FIG. 1 schematically illustrates a CCU including a power management MCU configured for verifying authenticity of electronic components attached to the CCU, in accordance with the present disclosure.

A system and method are provided including hardware configured to authenticate field replaceable electronics modules. In one embodiment, the authentication enables counterfeit and malicious device screening for use with plug-in components on a central control unit (CCU). The disclosed system and method utilize an asymmetric key architecture to support localized cryptographic services, including component attestation, message authentication code (MAC) key distribution, and secure nonvolatile memory express (NVMe) units unlock for CCU plug-in modules. Plug-in devices or devices with configurable software may be challenged to attest, and, based upon passing the attestation, may be established as one of a plurality of trusted devices. Once the plurality of trusted devices is identified, symmetric MAC keys may be distributed and the plurality of trusted devices may communicate securely. Non-conforming devices or devices failing the attestation process may be isolated from communicating with the plurality of trusted devices. No Internet connection or specialized service tools are required to commission the plug-in or configurable devices. Two primary features of the disclosed system and method include no internet connection is required, which means that the units can be field replaced, added, or upgraded; and electronic units can autoconfigure themselves by attestation to authenticate legitimate components and then using elliptic-curve Diffie-Hellman (ECDHE) to locally distribute symmetric keys to trusted devices. Symmetric keys are used by devices to generate message authentication codes to ensure that messages have not been modified in flight by a man-in-the-middle device (MitM device).

Public and private keys may be numbers, for example, a string of hexadecimal numbers. An operation to sign a public key with a private key may be a simple mathematical operation, wherein the private key operates upon the public key through the mathematical operation, and a new number is generated. The public key along with the signature may be described as a certificate. A signing operation may be a one-way function, where even if you know the public key number, one may have a very difficult time reversing the function to determine the private key. In this way, by using the private key to operate upon a public key, one may know with strong certainty that the device acted upon the public key. Signatures may be used to validate encrypted messages from a device. Messages may also be signed with a private key. The message and concomitant signature can then be verified with a public key. The private and public keys are linked, but the public key cannot be easily inverted or otherwise processed to reveal information about the private key. Signatures, messages and concomitant signatures, and signed contextual material may additionally be stored within a device and used to establish a certificate history or a chain of trust back to a root of trust for the device, for example, establishing a root of trust back to a manufacturer or auditing authority.

According to the disclosed method, cryptographic keys are locally generated, provisioned or distributed. A serviceable module or an electronic control unit (ECU) is provided which generates or stores a unique device secret that is unknown to the either a component manufacturer or an end product manufacturer. In one embodiment, the ECU may be a vehicular component for use in a CCU installed upon a vehicle. In such a case, the end product manufacturer is the manufacturer of the vehicle, and the component manufacturer may be the company that supplies a particular ECU to the manufacturer. The ECU generates and stores a device identity public/private key pair from the unique device secret. The device identity public key is presented to be signed, for example, by the component manufacturer. The ECU stores the signed device identity key or ECU certificate.

The ECU certificate may, in some embodiments, be presented to the end product manufacturer for signature. The ECU may then store the signed ECU certificate or the end product manufacturer's root certificate. In another embodiment, the component manufacturer's signature is a final certificate stored by the ECU, and the ECU certificate is provided for storage to the end product manufacturer in case revocation is required later. Based upon the stored certificate (end product manufacturer's root certificate or the final ECU certificate), the ECU generates an attestation public/private key pair using the unique device secret. The ECU signs the attestation public key using the device identity private key. The ECU generates Diffie-Hellman (DH) public/private key pairs and signs the DH public key using the device identity private key.

In one embodiment, the ECU including the DH public/private key pairs may be utilized in combination with a CCU configured for use with plug-in modules or components. In a process that may be described as utilizing PKI for commissioning the CCU, the CCU may utilize trusted components, for example, components soldered to the circuit board to challenge or require attestation from plug-in or interchangeable components. This attestation process enables confirmation that the ECU and one or more other devices are trusted and have been authorized for use by the end product manufacturer. The ECU may utilize the CCU to distribute signed DH keys to form a shared secret between the ECU and another trusted component attached to the CCU. Use of the signed DH keys and the attestation process enables disallowing of components receiving power and data transfer access through peripheral component interconnect express (PCIe) connections and the CCU based upon a certificate revocation list.

With PKI, an internet connection or specialized service tools are not required to provision or distribute plug-in module keys to support localized cryptographic services, such as attestation, secure unlocks, and message authentication. Once authenticate devices are established, one may automatically establish symmetric keys across those trusted devices. Autoconfiguration of symmetric keys using asymmetric attestation and key exchange eliminates significant infrastructure we have in place to do this today. This allows components to be serviced or upgraded in areas where internet service may not be present, infrastructure is damaged, or service is otherwise inoperable. This allows for excellent part distribution, serviceability, and upgradeability.

The disclosed system and method utilize asymmetric keys. Symmetric keys with concomitant infrastructure may alternatively be utilized with a similar process. For example, symmetric MAC keys and a message authentication calibration table (MACT) may be used to authenticate interprocessor messages. However, this requires significant infrastructure support and coordination which are made unnecessary by the disclosed system and method.

MACs include Galois Message Authentication Code (GMAC), hash-based message authentication code (HMAC), cipher-based message authentication code (CMAC), Poly1305, or other similar MAC types. MACT are used to coordinate different symmetric keys across different ECUs. For example, if one has devices A, B, and C, A and B would share one symmetric key, A and C would share a different symmetric key and B and C would share a third symmetric key.

PCIe data management is different than ethernet data management in that PCIe is largely about writing to or reading memory blocks. Messages are not a primary consideration for PCIe. In this case, a MAC can be calculated over a block of data, the unauthenticated data can be sent between devices along with the MAC using a PCIe vendor defined message. At the other end, the receiving device can calculate the MAC of the received data and compare it against the expected MAC received from the sender.

A private device identification key or private ID key may be used to sign local keys, such as attestation, encryption, remote access, shared access, ownership, MACs, and storage. The device ID public key is used to verify that the local key was signed by a legitimate private key. Each security operation may have a unique key. Unique keys enable a manufacturer to decide whether to incorporate certain features in a system or vehicle. One example includes enabling secure NVMe unit unlock. Such selective feature enablement is useful for over-the-air (OTA) feature additions or remote upgrades.

Secure NVMe unlock is a useful benefit that may be derived from and made more easy to implement as a result of the disclosed system and method. NVMe units are solid state data drives. Without unlocking information to send to the units, the NVMe units are useless if taken. The disclosed system and method may enable a device within a vehicle or other application to sign an encrypted unlock request to the NVMe units with a private key. According to the disclosed system and method, each of the requesting device and the NVMe unit may have had trust established and symmetric keys distributed, thereby making the signed unlock request easy to generate. Without the signed unlock request, the NVMe unit will securely hold and not release information stored thereupon. According to one embodiment, after establishing a shared secret using elliptic curve Diffie-Hellman key exchange (ECDHE), the requesting device may send an authenticated encrypted unlock request to the drive. Authentication of the encrypted message may be done using Advanced Encryption Standard-Galois/Counter Mode (AES-GCM) or equivalent. In this way, the disclosed system and method may use asymmetric and symmetric cryptographic techniques to securely unlock an NVMe drive, preventing passcodes from being intercepted in transit over local communication links.

OTA feature additions are a popular way to provide customers with an up to date and fresh device or system. For example, new features for an electronic device such as enhanced streaming services based upon improving cellular connectivity may become available. As software and firmware code is updated by wireless transmission to the system, the behavior and characteristics of the electronic device may change radically. These changes may need to be confirmed, such that the system owner may reliably know that the software or firmware changes are authentic and legitimate. The disclosed system and method may authenticate appropriate behavior and responses of the electronic device, and once trust is established, local keys may be generated and distributed such that the updated device may continue to operate seamlessly with the rest of the system. No complicated key distribution scheme from a central office is required, as the local PKI distribution method disclosed enables the symmetric keys to be generated and distributed locally.

A useful feature of the disclosed system and method is an ease of PKI distribution within a local group of electronic devices or components. Some key distribution methods include a single set of keys being generated and used through the life of the devices. If an intruding or rogue device is used to successfully capture those keys from the existing devices, data security is lost for the system. Both past and future data in the system are no longer secret. With the disclosed system and method, if an intruding or rogue device somehow gain the presently used keys, the keys may be regenerated every time the system powers up or resets. The exposure that may be caused by the intruding or rogue device may be limited to when the current keys are active. This limit to exposure of future data may be described as perfect forward security.

The attestation key may not be anonymous. The device ID may be detectable. An additional layer may be created to separate a device ID from the attestation key, making it anonymous. Anonymous attestation keys may be useful in certain situations.

Referring now to the drawings, wherein like reference numbers refer to like features throughout the several views, FIG. 1 illustrates a CCU 10 including a power management microcontroller (MCU) 20 configured for verifying authenticity of electronic components attached to the CCU 10. The CCU 10 is illustrated including a PCIe switch 30, a slot A—computer main unit 32, a slot B—compute unit addon #1 34, a slot C—compute unit addon #2 36, and a slot D—compute unit addon #3 38. The CCU is illustrated further including an NVMe unit #1 40, an NVMe unit #2 42, an NVMe unit #3 44, and an NVMe unit #4 46. The CCU 10 is illustrated further including connectors 15, an ethernet switch unit 22, a power tree 24, a PCIe retimer 50, a video input unit #1 60, and a video input unit #2 62.

The CCU 10 operates as a computerized unit. The slot A—computer main unit 32 includes a processor, random-access memory (RAM), and memory storage and may provide computerized function, executing programming which may include an operating system. The PCIe switch 30, in combination with the slot B—compute unit addon #1 34, the slot C—compute unit addon #2 36, and the slot D—compute unit addon #3 38, provide expandable options, wherein SoCs may be installed to one of the slot B—compute unit addon #1 34, the slot C—compute unit addon #2 36, and the slot D—compute unit addon #3 38. The flexibility provided by the slots 34, 36, and 38 may be beneficial to operation of a vehicle including the CCU 10 and may provide versatility to the owner of the vehicle. However, the ability to add plug-in components (such as systems-on-a-chip (SoCs)) and other computerized devices to the CCU 10 may open possibilities of counterfeit hardware or counterfeit software being connected to the CCU 10 and operating with the vehicle. The disclosed system and method provide an ability to allow the vehicle owner to take advantage of the versatility of the slots 34, 36, and 38 while protecting the vehicle from adverse effects of counterfeit hardware or software. The disclosed system and method may also be used by the plug-in module to make sure that it has been installed in a legitimate CCU 10 before it allows communications. For example, a standalone module can be plugged into a debug device and subsequently modified through the PCIe, I2C, SPI or other communication links.

Some components to the CCU 10 may be serviceable by end users or consumers-at-large. Other components to the CCU 10 may require knowledge of the hardware and software involved and may require a service technician with computerized equipment enabling service of the components. Other components to the CCU 10 may be installed at the original assembly location and may be otherwise unserviceable without replacing the CCU 10 with a new unit.

Table 1 illustrates exemplary serviceability of the CCU 10 of FIG. 1 and components thereto.

TABLE 1

Serviceability for Components of FIG. 1

| System Component | Serviceability/Replacement | | | |
|---|---|---|---|---|
| | Original Manufacturer | Dealership Technician | Manufacturer Service Center | Customer End User |
| CCU 10 | X | X | | |
| Compute Main Unit (Slot 32) | X | X | X | X |
| Compute Unit Add-On (Slots 34, 36, 38) | X | X | X | X |
| Ethernet Switch Unit 22 | | | X | |
| NVMe Units 40, 42, 44, 46 | | X | X | X |
| Video Input Units 60, 62 | | | X | |

Figure 8:
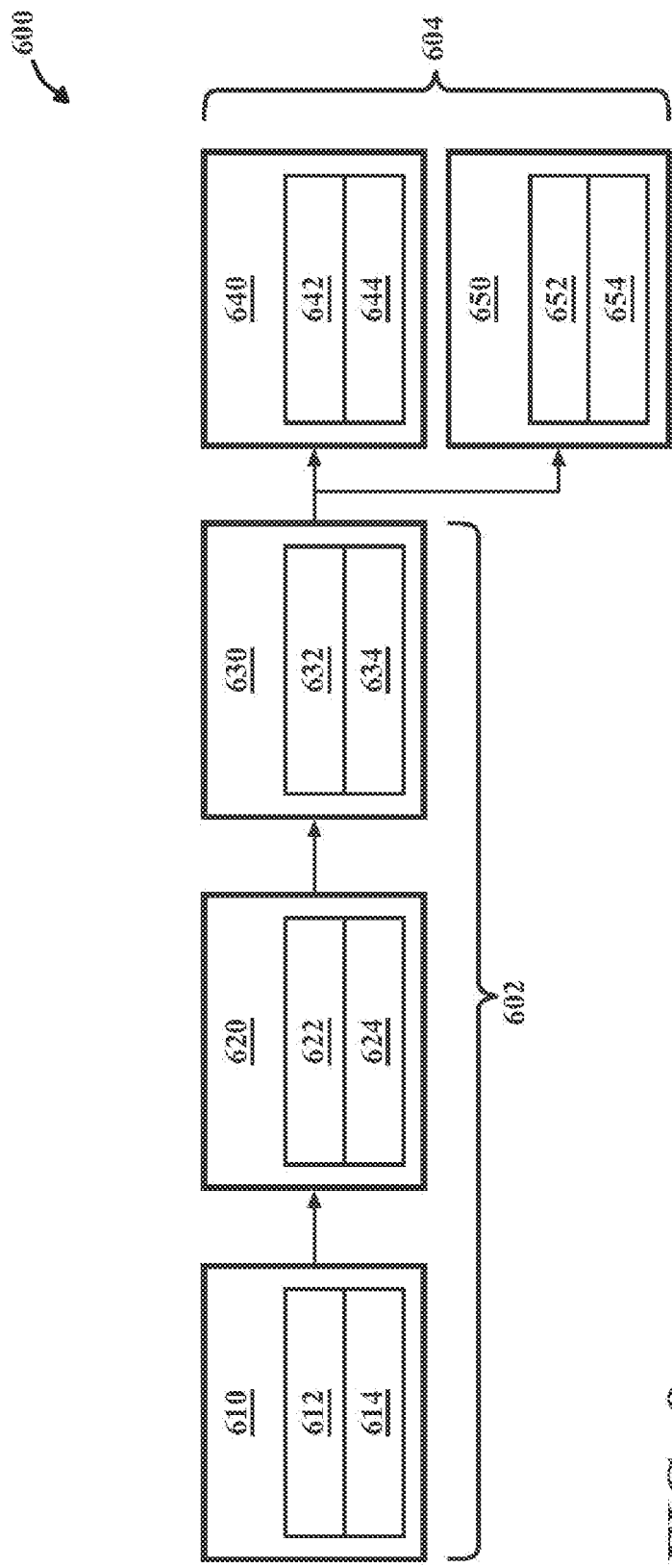
FIG. 8 is a flowchart illustrating an exemplary key distribution flow to create, sign, and distribute device keys for local use with a local group of electronic devices, in accordance with the present disclosure.

In order to enable encrypted communications between electronic devices or electronic components as part of a larger electronic device, one may securely distribute public/private key pairs to each device securely, with physical security being utilized to ensure that key pairs are installed to devices in a secure manner. This security intensive and device specific process is intensive. The disclosed system and method make this physically secure and intensive process unnecessary. Trusted key pairs are created using digital signatures, and these trusted, signed key pairs may be securely electronically distributed to devices. The digital signatures include certificate chains enabling an audit or review of the signed key pairs, foiling attempts to counterfeit or spoof the key pairs along the way. FIG. 8 is a flowchart illustrating an exemplary key distribution flow 600 to create, sign, and distribute device keys for local use with and between a local group of electronic devices. The key distribution flow 600 includes a first portion 602 through which device identity is established. A fully commissioned device, according to the exemplary key distribution flow 600 of FIG. 8, will include three signed public keys (otherwise known as three certs. or certificates). These three signed public keys are stored upon the device. Initially at inception of the device, the device includes a microprocessor that may generate its private key (which is never shared but is used to sign information through the life of the device) and an unsigned public key. In another embodiment, the private key may be injected into the device during a secure process. According to operations 610, 620, and 630, the unsigned public key of the device is signed by the component manufacturer. Further, a public key of the component manufacturer signed by the end product manufacturer is transferred to and stored within the device. Further, a self-signed public key of the end product manufacturer is transferred to and stored within the device. By storing these three signed public keys in the device, the device may make these signed public keys available to any requesting device, establishing a chain of trust or a certificate history for the device which may be a root of trust for the system to trust the device. The key distribution flow 600 further includes a second portion 604 wherein local cryptographic services are accomplished.

The first portion 602 includes operation 610, wherein, in sub-operation 612, the end product manufacturer creates a key pair including an end product manufacturer's private key and a manufacturer's public key for a device and, in sub-operation 614, the end product manufacturer self-signs the key pair. The first portion 602 further includes operation 620, which is optional based upon whether a separate component manufacturer creates the device. In sub-operation 622, the component manufacturer creates a key pair for the device and, in sub-operation 624, a public key of the component manufacturer's key pair is signed by the manufacturer's private key. The first portion 602 further includes a operation 630, wherein, in sub-operation 632, a key pair is created for the device and, in sub-operation 634, a device ID public key of the key pair is signed by the component manufacture's private key. In an embodiment wherein the operation 620 is not utilized, the device ID public key may instead be signed by the manufacturer's private key. This first portion 602 of the key distribution flow 600 enables trust to be conferred from one trusted source to the next. The end product manufacturer trusts its own remote server device that stores private keys. The end product manufacturer confers trust upon a component manufacturer by signing the component manufacturer's public key. The component manufacturer trusts its stored private key and uses that private key to sign and thereby confer trust upon the device public key. In this way, in portion 602, one may establish device identity and enable the device to utilize secure keys including a certificate history of signatures in order to establish trust in the device. In one embodiment, for example, when the end product manufacturer makes the device, the device will not have three signed public keys, but rather, will have two signed public keys.

Once the device is commissioned with three signed public keys or certs., the device may create and establish symmetric DH keys locally without gaining permission or authority from a remote manufacturer. The root of trust established in the device is enough to enable this device to manage local certs. for local cryptographic services. The second portion 604 of the key distribution flow 600 includes providing local cryptographic services locally in a group of devices based upon the trust conferred in the first portion 602. At operation 640, attestation may be utilized to establish trust between a group of local devices. Devices may, in sub-operation 642, challenge each other, for example, at boot, reset, or other defined event, and, in sub-operation 644, the devices may utilize asymmetric key pairs to, create in one device a signed digest (the challenge and measurement values from the device being challenged processed by a hash function and then signed by the device's private key) and check that signed digest in the signed digest in the second device. In this way, trust may be established between groups of electronic devices.

At operation 650, once trust has been established in operation 640, in sub-operation 652, a Diffie-Hellman process may be utilized to distribute symmetric MAC keys, symmetric keys that can be used for encryption, authentication, authenticated encryption, or authenticated encryption with associated data. At sub-operation 654, these distributed symmetric MAC keys may be signed by the device ID private keys to establish trust in the MAC keys, which may then be used in secure communication between the plurality of trusted devices.

The second portion 604 is useful, because conferred trust in each of the plurality of devices may be utilized to establish the plurality of trust devices and distribute secure keys among the trusted devices. Whereas some method require communication with a remote server to establish trust, download lists of revoked device certificates or a certificate revocation list, delays associated with requiring remote registration of devices, etc., the key distribution flow 600 enables trust to be initially conferred to devices, and this trust may then be utilized locally to establish the plurality of trusted devices and enable cryptographically protected communication between the plurality of trusted devices without remote intervention.

Figure 2:
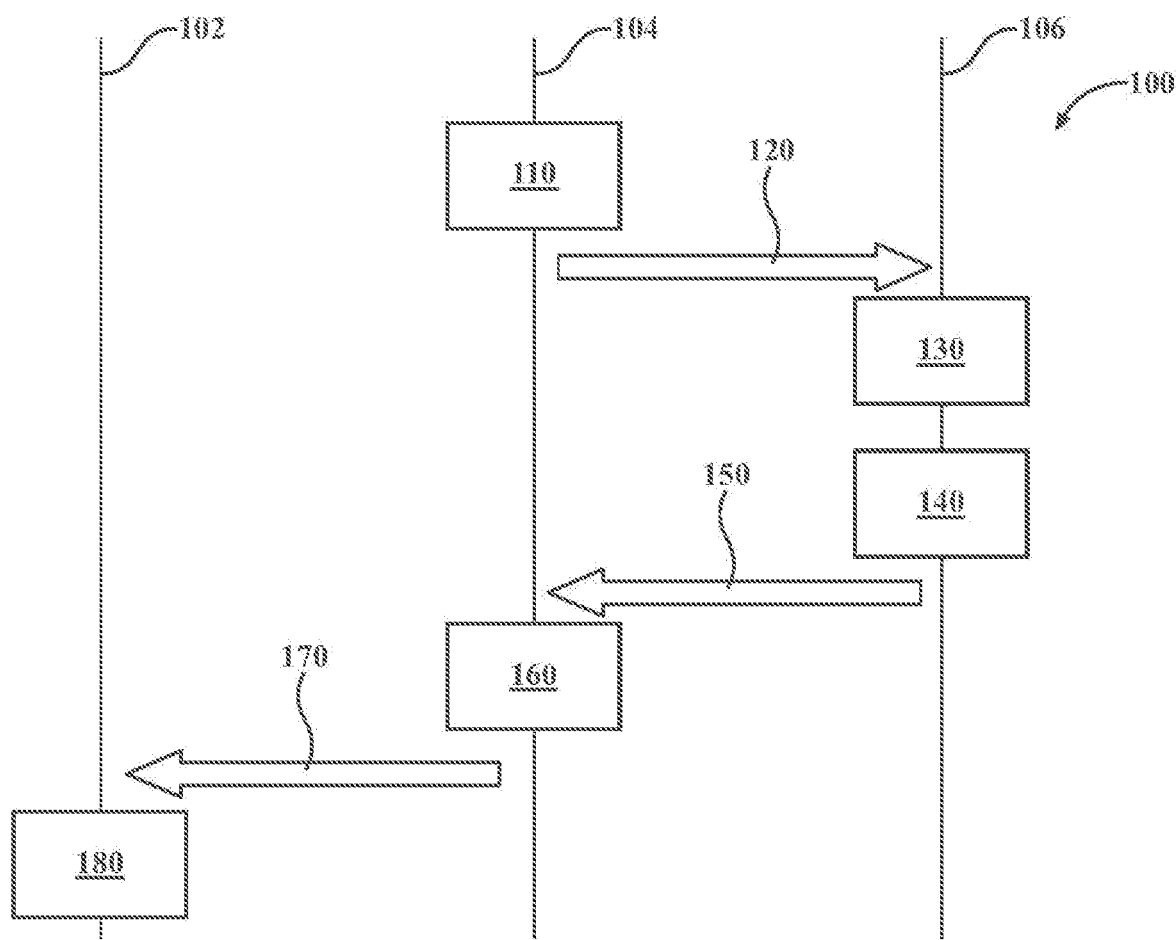
FIG. 2 is a flowchart illustrating an exemplary method to establish certificates for an ECU, including signatures by a component manufacturer and an end product manufacturer, in accordance with the present disclosure.

FIG. 2 is a flowchart illustrating an exemplary method 100 to establish certificates for an ECU, including signatures by a component manufacturer and an end product manufacturer. Vertical line 102 represents method steps taken locally within the ECU. Vertical line 104 represents method steps taken by a component manufacturer. Vertical line 106 represents method steps taken by an end product manufacturer. In an embodiment wherein the end product is a vehicle, the vertical line 106 represents method steps taken by the vehicle manufacturer. At step 110, the component manufacturer generates the ECU public and private key pair for the device. At step 110, the component manufacturer may additionally sign the ECU public key to create an ECU certificate. At step 120, the method transitions from the component manufacturer to the end product manufacturer, with the component manufacturer providing to the end product manufacturer the ECU's public key. At step 130, the end product manufacturer signs the ECU's public key or the ECU certificate to create the end product manufacturer's root certificate for the device. At step 140, the end product manufacturer stores the signed ECU's public key as the ECU certificate. At step 150, the method transitions from the end product manufacturer to the component manufacturer, with the end product manufacturer providing to the component manufacturer the end product manufacturer's root certificate. At step 160, the method transitions from the component manufacturer to the device, with the component manufacturer sending the ECU certificate and the end product manufacturer's root certificate to the device. At step 170, the ECU certificate and the end product manufacturer's root certificate are transferred to the device. At step 180, the certificates stored upon the device. In this way, an ECU may be provided keys useful to operating attestation processes to authenticate the device when it is connected to a CCU. The same or a similar process may be utilized to provide keys to SoCs, an ethernet control switch, NVMe units, and other electronic devices that may be authenticated.

Figure 3:
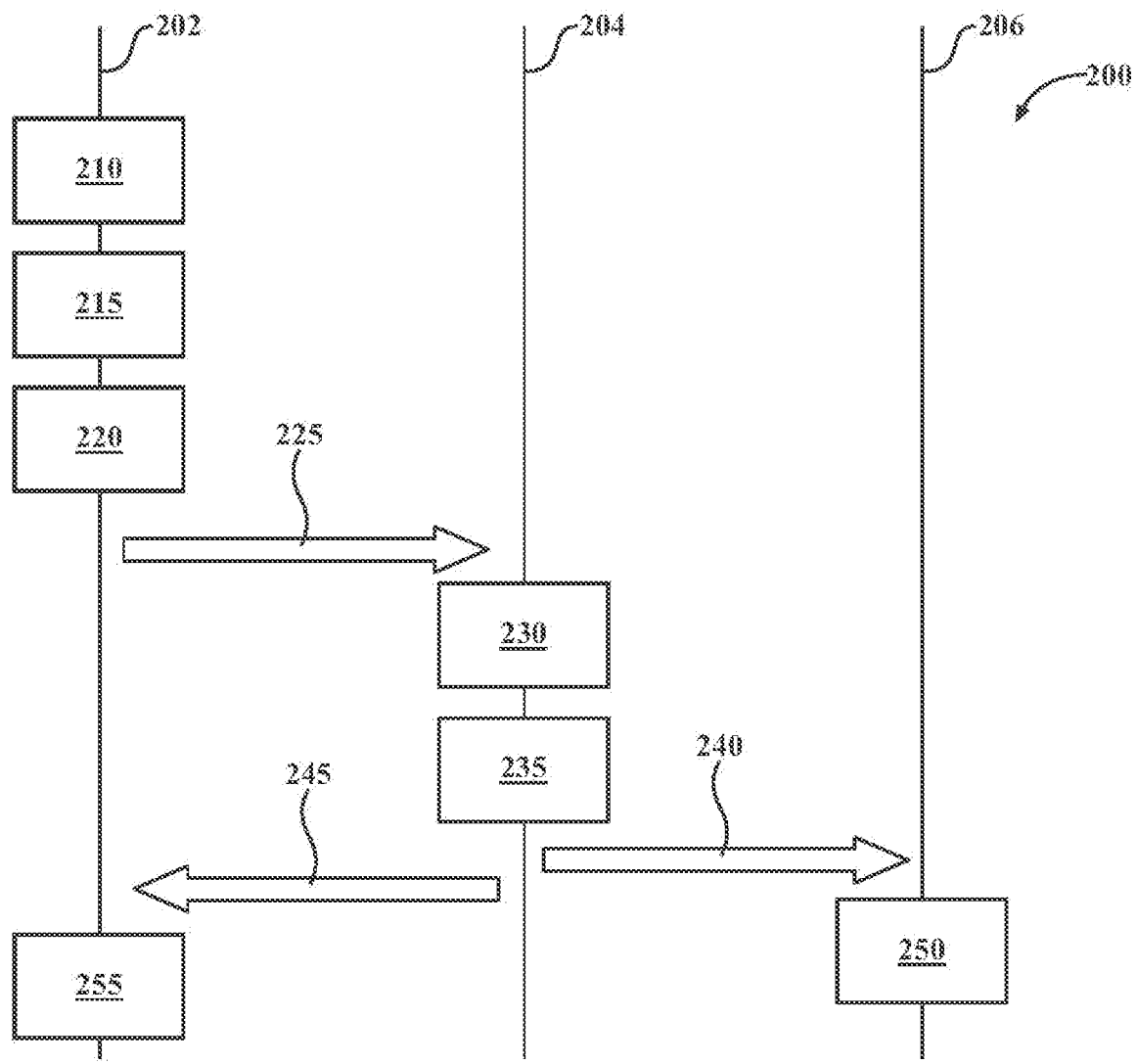
FIG. 3 is a flowchart illustrating an exemplary method to establish certificates for an ECU, including device ID keys being created within the ECU and including a signature by a component manufacturer, in accordance with the present disclosure.

FIG. 3 is a flowchart illustrating an exemplary method 200 to establish certificates for an ECU, including device ID keys being created within the ECU and including a signature by a component manufacturer. Vertical line 202 represents method steps taken locally within the ECU. Vertical line 204 represents method steps taken by a component manufacturer. Vertical line 206 represents method steps taken by an end product manufacturer. In an embodiment wherein the end product is a vehicle, the vertical line 206 represents method steps taken by the vehicle manufacturer. At step 210, the device generates or loads a unique device secret (UDS). At step 215, the device uses the UDS to generate a device ID public and private key pair. At step 220, the device stores the ID key pair locally. At step 225, the method transitions to the component manufacturer, with the device providing the device ID public key to the component manufacturer. At step 230, the component manufacturer signs the device ID public key with the component manufacturer's ECU private key, thereby creating an ECU certificate or a device ID certificate. At step 235, the component manufacturer stores the device ID certificate. At step 240, the component manufacturer provides the device ID certificate to the end product manufacturer. At step 245, the component manufacturer provides the device ID certificate to the device. At step 250, the end product manufacturer stores the device ID certificate. At step 255, the device stores the device ID certificate.

In this way, an ECU may possess keys useful to operating attestation processes to authenticate the device when it is connected to a CCU, with the keys being signed by the component manufacturer. The same or a similar process may be utilized to provide keys to SoCs, an ethernet control switch, NVMe units, and other electronic devices that may be authenticated.

Figure 4:
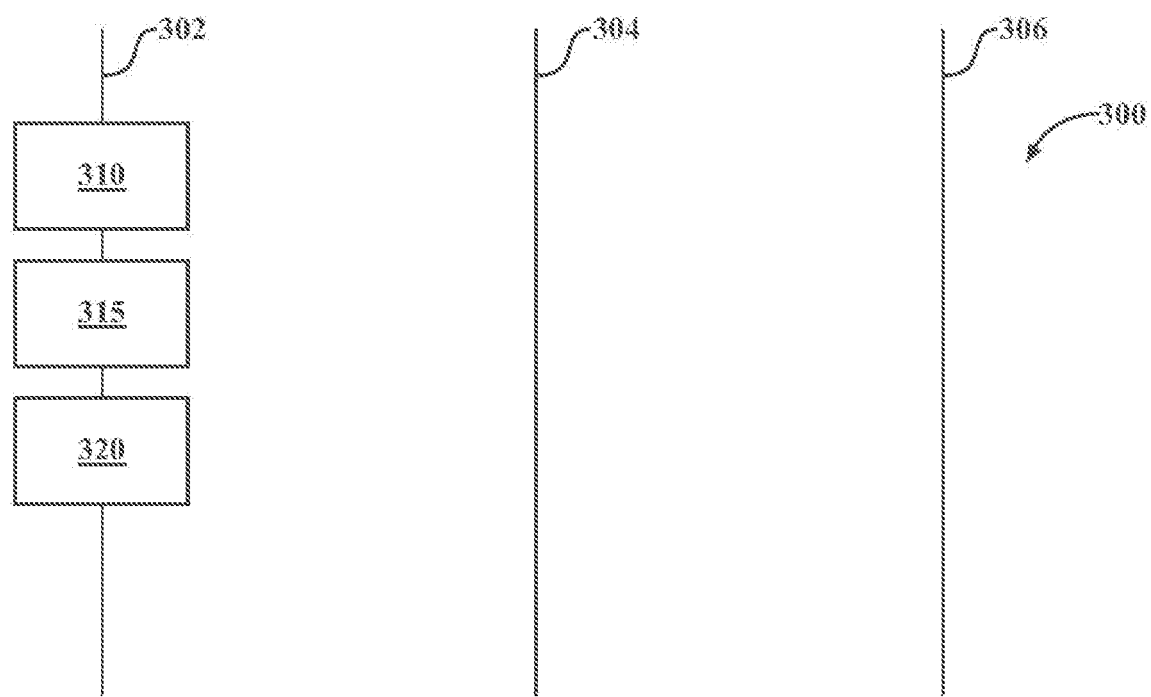
FIG. 4 is a flowchart illustrating an exemplary method to establish certificates for an ECU, including device ID keys being created within the ECU and being stored locally within the device without signatures, in accordance with the present disclosure.

FIG. 4 is a flowchart illustrating an exemplary method 300 to establish certificates for an ECU, including device ID keys being created within the ECU and being stored locally within the device without signatures. Vertical line 302 represents method steps taken locally within the ECU. Vertical line 304 represents method steps taken by a component manufacturer. Vertical line 306 represents method steps taken by an end product manufacturer. In an embodiment wherein the end product is a vehicle, the vertical line 306 represents method steps taken by the vehicle manufacturer. At step 310, the device generates or loads a UDS and uses the UDS to generate a device ID public and private key pair. At step 315, the device signs the device ID public key locally with the device ID private key, which creates a device ID certificate. At step 320, the device stores device ID public and private key pair and the device ID certificate. In this way, an ECU may possess keys useful to operating attestation processes to authenticate the device when it is connected to a CCU, with the keys being created and signed locally by the device. The same or a similar process may be utilized to provide keys to SoCs, an ethernet control switch, NVMe units, and other electronic devices that may be authenticated.

Figure 5:
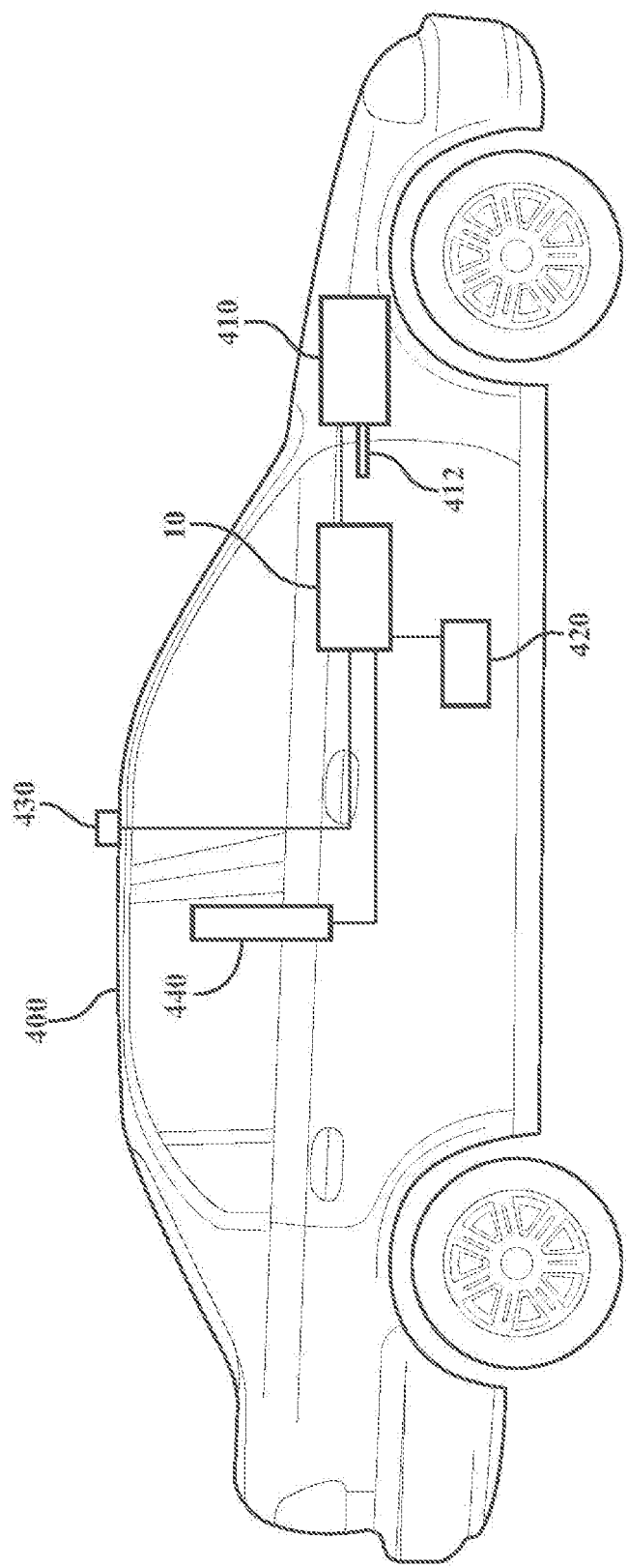
FIG. 5 schematically illustrates an exemplary device including a vehicle including the CCU and a plurality of other vehicle systems which may be controlled by the CCU, in accordance with the present disclosure.

FIG. 5 schematically illustrates an exemplary device 400 including a vehicle including the CCU 10 and a plurality of other vehicle systems which may be controlled by the CCU 10. The device 400 includes the CCU 10, an electric machine 410 configured for providing an output torque through an output component 412, a braking system 420, a wireless communication receiver and antenna 430, and a rear seat entertainment system 440. The disclosed system and method enable the CCU 10 to provide computerized control over the illustrated vehicular systems with confidence that modules within the CCU 10 and the software thereof are authenticated and will provide operation of the device 400 according to parameters intended by the manufacturer.

Figure 6:
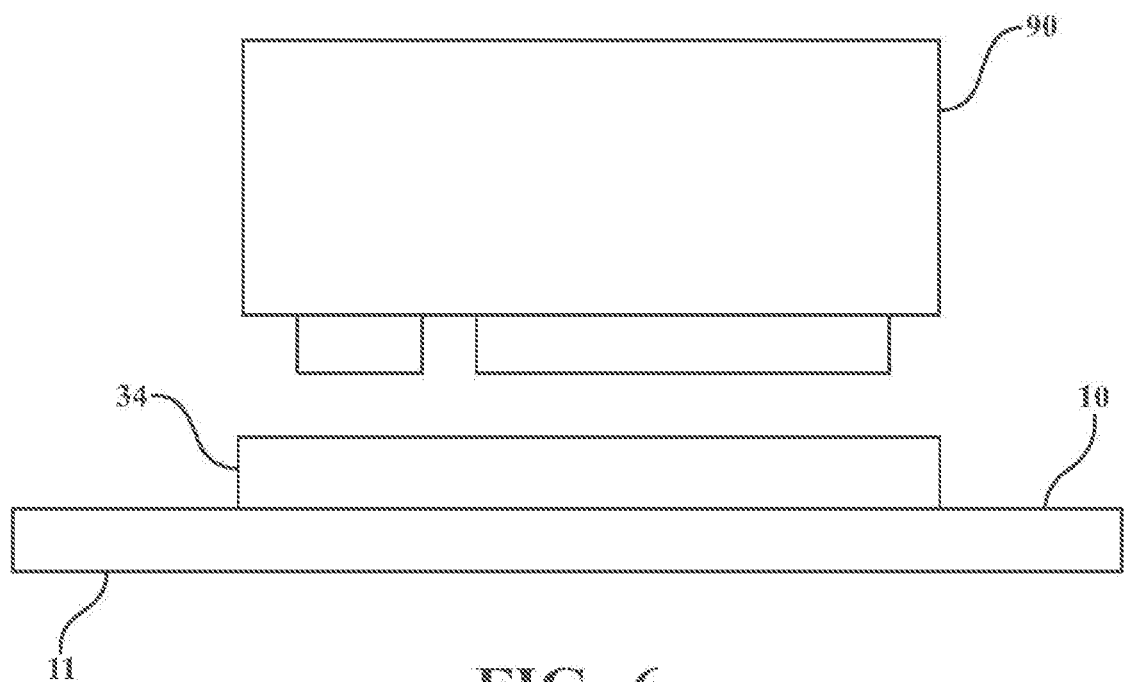
FIG. 6 schematically illustrates an exemplary SoC unit being plugged into the slot B—compute unit addon number one of the CCU, in accordance with the present disclosure.

FIG. 6 schematically illustrates an exemplary SoC unit 90 being plugged into the slot B—compute unit addon #1 34 of the CCU 10. The SoC unit 90 includes a PCIe connector configured for plugging in to a mating connection on the slot B—compute unit addon #1 34 which is connected to circuit board 11.

Figure 7A:
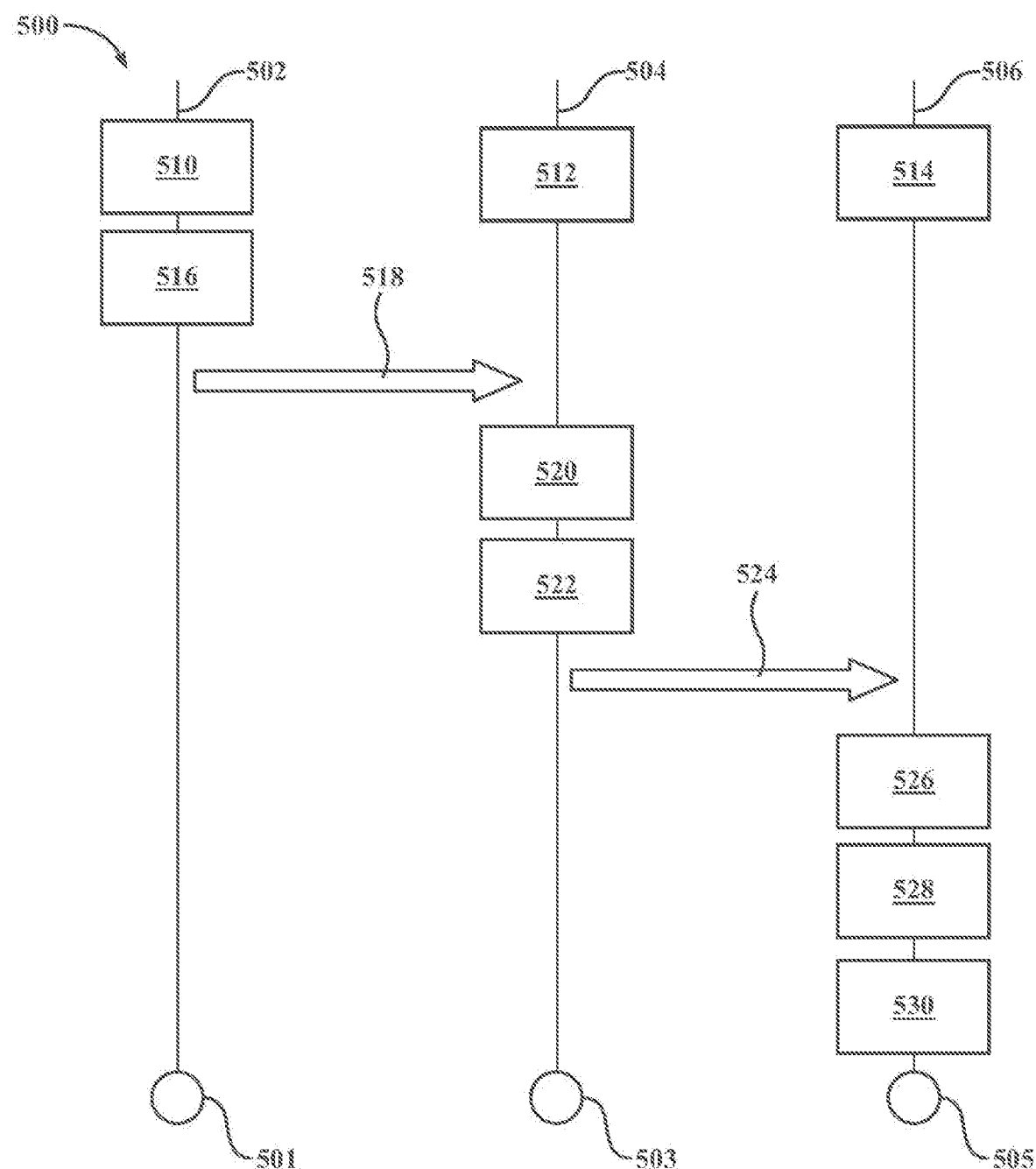
FIGS. 7A and 7B are a flowchart illustrating a method for symmetric MAC key distribution using Diffie-Hellman key exchange, in accordance with the present disclosure.
Figure 7B:
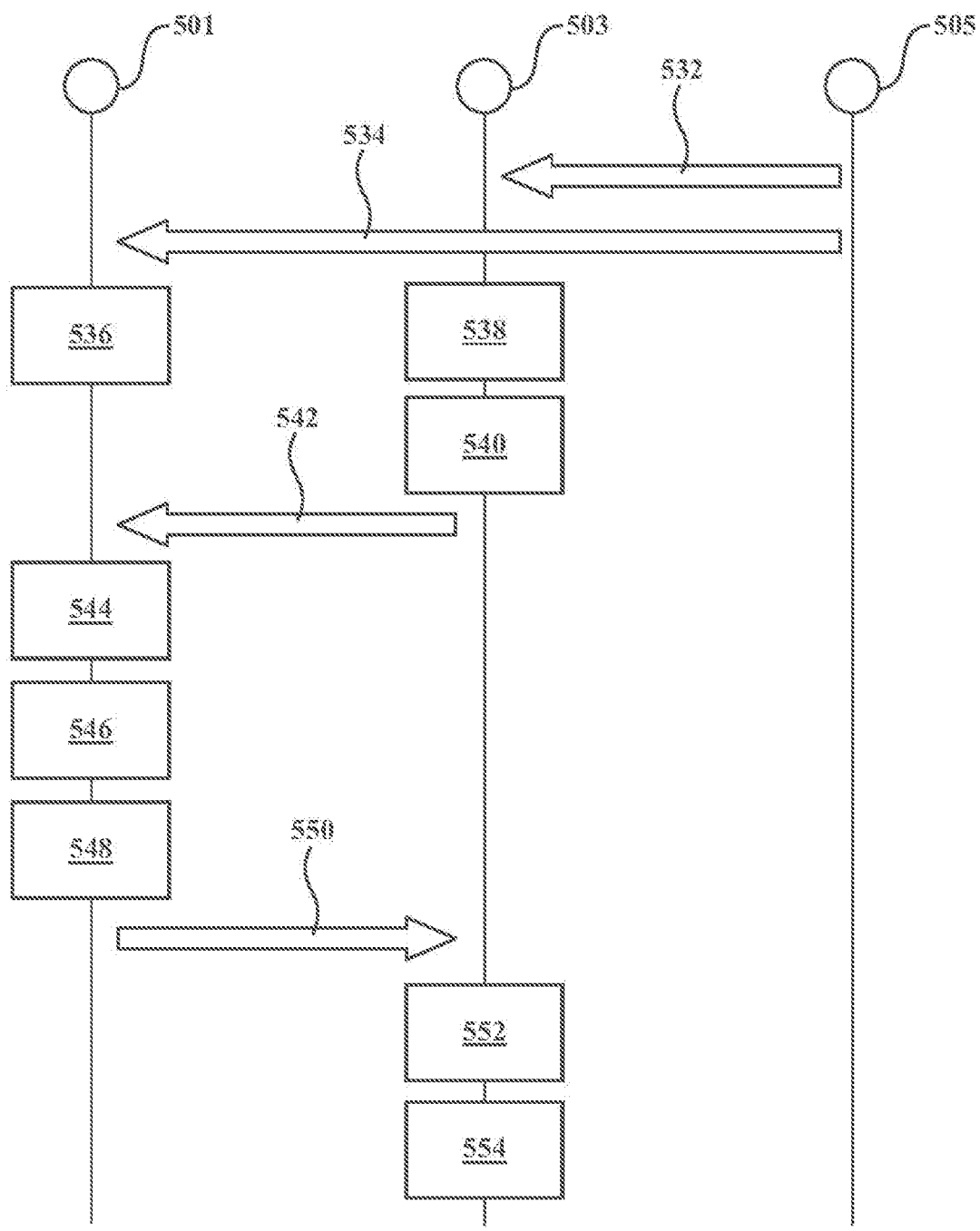

Diffie-Hellman key exchange is a process whereby a plurality of trusted devices may create a shared secret to be held by plurality of trusted devices. This shared secret enables secure communications between the plurality of trusted devices and prevents an unauthorized or compromised device from communicating. FIGS. 7A and 7B are a flowchart illustrating a method 500 for symmetric MAC key distribution using Diffie-Hellman key exchange. The method 500 is provided as an exemplary, relatively simple version of a plurality of devices creating a shared secret. The method 500 is exemplary, and other versions, such as an elliptic curve Diffie-Hellman method may be utilized for increased security and/or ease of use. FIGS. 7A and 7B illustrate a single method 500, with connectors 501, 503, and 505 illustrating continuous vertical lines spanning the Figures. Vertical line 502 illustrates operations performed by a Device A. Vertical line 504 illustrates operations performed by a Device B. Vertical line 506 illustrates operations performed by a Device C. Devices A, B, and C represent a plurality of trusted devices that, through an attestation process, have proven to each other through possession of private keys with valid certificate chains, the authenticity of each of the devices and the software therein. At steps 510, 512, and 514, secure and trusted private keys and public keys are established in each of the Device A, the Device B, and the Device C, respectively. The steps 510, 512, and 514, for example, are accomplished through the first portion 602 of the key distribution flow 600. At step 516, the Device A signs its public key with its private key. This signed public key is a numeric output which may represent the public key taken the power of the private key. This signed key is transferred at step 518 to the Device B. At step 520, the Device B verifies the signed key from Device A. The Device B, at step 522, signs the signed key of Device A by taking the signed key of device A to the power of the private key of the Device B. This creates the public key of Device A signed by the Device A and the Device B or a dually signed key. This dually signed key is provided at step 524 to the Device C. At step 526, the Device C verifies the dually signed key. At step 528, the Device C signs the dually signed key by taking the dually signed key to the power of the private key of Device C. This third signature creates a shared secret between the Device A, the Device B, and the Device C.

At step 530, the Device C signs its public key with its private key. This signed public key of Device C is transferred at step 532 to the Device B. The signed public key of Device C is again transferred, this time to Device A, at step 534. At step 536, the Device A verifies the signed key of Device C. At step 538, the Device B verifies the signed key of Device C. At step 540, the Device B signs the signed key of Device C with the private key of Device B, creating a second dually signed key. At step 542, the Device B transfers the second dually signed key to the Device A. At step 544, the Device A verifies the second dually signed key. At step 546, the Device A signs the second dually signed key with the private key of Device A, thereby creating a second shared secret between the Device A, the Device B, and the Device C.

At step 548, the Device A may determine the public key of Device C signed by the private key of Device C. This determined signed key of Device C is signed by the private key of Device A to create a third dually signed key. At step 550, the third dually signed key is transferred to the Device B. At step 552, the Device B verifies the third dually signed key. At step 554, the Device B signs the third dually signed key, thereby creating a third shared secret between the Device A, the Device B, and the Device C.

The method 500 is useful to establish a shared secret between the three devices, Device A, Device B, and the Device C. These are exemplary devices, and the process may be established for a number of a plurality of trusted devices. This shared secret may then be used to establish encrypted communications between the plurality of trusted devices, such that no counterfeit, malicious, or rogue device may communicate with the plurality of trusted devices.

The disclosed electronic components and combinations thereof may be configured for achieving a wide variety of tangible functions. In a plurality of non-limiting examples, the electronic components may control access and content of an entertainment system, operation of wireless communications, navigational instructions provided to a unit or device, monitoring of sensors and processing of sensor information, operation and speed of an electric motor, and various functions in a vehicle such as navigation, propulsion, braking, environmental systems, wipers, headlights, and infotainment within the vehicle. The disclosed system and method provide increased security to these systems to avoid unintended, malicious, unauthorized, rogue, or otherwise inappropriate operation of these systems and their tangible outputs.

While the best modes for carrying out the disclosure have been described in detail, those familiar with the art to which this disclosure relates will recognize various alternative designs and embodiments for practicing the disclosure within the scope of the appended claims.

What is claimed is:

1. A method for public key infrastructure for serviceable electronic components, the method comprising:
   identifying a plurality of electronic components in electronic communication with each other;
   establishing that each of the plurality of electronic components is a trusted device according to a certificate history including a plurality of signed public keys stored upon the respective electronic component;
   utilizing signed Diffie-Hellman key exchange to distribute symmetric keys to each of the plurality of electronic components, wherein utilizing the Diffie-Hellman key exchange to distribute symmetric keys to each of the plurality of electronic components includes establishing a shared secret between the plurality of electronic components and establishing the shared secret includes:
      iteratively signing public keys of the plurality of electronic components with private keys of the plurality of electronic components to create signed public keys; and
      defining the shared secret based upon the signed public keys of the plurality of electronic components; and
   communicating between the plurality of electronic components with the symmetric keys to achieve tangible functions that may be provided by the plurality of electronic components.

2. The method of claim 1, wherein establishing that each of the plurality of electronic components is the trusted device according to the certificate history includes creating and storing upon the respective electronic component a signed public key of an end product manufacturer, a signed public key of a component manufacturer, and a signed public key of the electronic component.

3. The method of claim 2, wherein creating and storing upon the respective electronic component the signed public key of the end product manufacturer, the signed public key of the component manufacturer, and the signed public key of the electronic component includes:
   the end product manufacturer self-signing the public key of the end product manufacturer;
   the end product manufacturer signing the public key of the component manufacturer; and
   the component manufacturer signing the public key of the device.

4. The method of claim 1, wherein the plurality of electronic components is installed to a vehicle; and
   wherein communicating between the plurality of electronic components includes providing electronic commands to a system of the vehicle affecting operation of the vehicle.

5. The method of claim 4, wherein the system of the vehicle includes one of a navigation system, a braking system, a system controlling an electric motor, and an infotainment system.

6. The method of claim 1, wherein establishing that each of the plurality of electronic components is the trusted device includes utilizing attestation between the plurality of electronic components.

7. The method of claim 6, wherein utilizing the attestation includes each of the electronic components challenging each other to provide responses signed by private keys and determining authenticity of the devices based upon validity of the responses.

8. The method of claim 6, wherein the plurality of electronic components are each connected to a central compute unit providing the electronic communication;
   wherein a first component of the plurality of electronic components is established as trusted by being soldered to the central compute unit; and
   wherein utilizing the attestation includes the first component of the plurality of electronic components challenging a second component of the plurality of electronic components and defining the second component as trusted based upon a reply from the second component.

9. A method for public key infrastructure for serviceable electronic components in a vehicle, the method comprising:
   identifying a plurality of electronic components in electronic communication with each other;
   establishing that each of the plurality of electronic components is a trusted device according to a certificate history including a plurality of signed public keys stored upon the respective electronic component, wherein establishing that each of the plurality of electronic components is the trusted device according to the certificate history includes creating and storing upon the respective electronic component a signed public key of an end product manufacturer, a signed public key of a component manufacturer, and a signed public key of the electronic component and creating and storing upon the respective electronic component the signed public key of the end product manufacturer, the signed public key of the component manufacturer, and the signed public key of the electronic component includes:
      the end product manufacturer self-signing the public key of the end product manufacturer;
      the end product manufacturer signing the public key of the component manufacturer; and
      the component manufacturer signing the public key of the device;
   utilizing Diffie-Hellman key exchange to distribute symmetric message authentication codes to each of the plurality of electronic components; and
   communicating between the plurality of electronic components with the symmetric message authentication codes to achieve tangible functions in a system of the vehicle affecting operation of the vehicle that may be provided by the plurality of electronic components.

10. The method of claim 9, wherein establishing that each of the plurality of electronic components is the trusted device includes utilizing attestation between the plurality of electronic components.

11. The method of claim 10, wherein utilizing the attestation includes each of the electronic components challenging each other to provide responses signed by private keys and determining authenticity of the devices based upon validity of the responses.

12. The method of claim 10, wherein the plurality of electronic components are each connected to a central compute unit providing the electronic communication; and wherein a first component of the plurality of electronic components is established as trusted by being soldered to the central compute unit; and wherein utilizing the attestation includes the first component of the plurality of electronic components challenging a second component of the plurality of electronic components and defining the second component as trusted based upon a reply from the second component.

13. The method of claim 9, wherein utilizing the Diffie-Hellman key exchange to distribute symmetric message authentication codes to each of the plurality of electronic components includes establishing a shared secret between the plurality of electronic components.

14. The method of claim 13, wherein establishing the shared secret includes:

iteratively signing public keys of the plurality of electronic components with private keys of the plurality of electronic components to create signed public keys; and defining the shared secret based upon the signed public keys of the plurality of electronic components.

15. A system for public key infrastructure for serviceable electronic components, the system comprising:

a plurality of electronic components in electronic communication with each other;

wherein each of the plurality of electronic components have been identified as trusted devices according to a certificate history including a plurality of signed public keys; and wherein each of the plurality of electronic components are configured for utilizing a Diffie-Hellman key exchange to distribute symmetric message authentication codes, wherein utilizing the Diffie-Hellman key exchange to distribute symmetric keys to each of the plurality of electronic components includes establishing a shared secret between the plurality of electronic components and establishing the shared secret includes:

iteratively signing public keys of the plurality of electronic components with private keys of the plurality of electronic components to create signed public keys; and defining the shared secret based upon the signed public keys of the plurality of electronic components.

16. The system of claim 15, wherein the plurality of electronic components are located on a vehicle.

17. The system of claim 15, wherein establishing that each of the plurality of electronic components is the trusted devices includes utilizing attestation between the plurality of electronic components.

18. The system of claim 17, wherein utilizing the attestation includes each of the electronic components challenging each other to provide responses signed by private keys and determining authenticity of the devices based upon validity of the responses.

* * * * *